United States Patent [19]

Mercier

[11] 3,928,459

[45] Dec. 23, 1975

[54] PROCESS FOR SPLITTING ACETALS AND HEMIACETALS

[75] Inventor: Jules Mercier, Melle, France

[73] Assignee: Rhone-Poulenc Industries, Paris, France

[22] Filed: Feb. 28, 1968

[21] Appl. No.: 708,775

[30] Foreign Application Priority Data
Mar. 29, 1967 France .............................. 67.100671

[52] U.S. Cl. .......................... 260/601 R; 260/632 B
[51] Int. Cl.² ............................................. C07C 45/00
[58] Field of Search ........................... 260/601, 615 A

[56] References Cited
UNITED STATES PATENTS

| | | | |
|---|---|---|---|
| 2,936,321 | 5/1960 | Mercier | 260/540 X |
| 2,980,731 | 4/1961 | Alheritiere et al. | 260/488 |
| 3,248,339 | 4/1966 | Spes et al. | 260/601 X |
| 3,317,593 | 5/1967 | Enk et al. | 260/601 X |
| 3,412,160 | 11/1968 | Schierbolt | 260/601 X |

OTHER PUBLICATIONS

Koskikallio et al., Trans, Far. Soc., Vol. 55, pp. 809–814, 1959.

*Primary Examiner*—James O. Thomas, Jr.
*Assistant Examiner*—R. H. Liles
*Attorney, Agent, or Firm*—McDougall, Hersh & Scott

[57] ABSTRACT

A process for splitting acetals and hemi-acetals in the form of a hydrolysis or alcoholysis reaction carried out in a liquid medium in the presence of a sulfonic acid ion exchange resin on the acid side, preferably at a temperature within the range of 60° to 140° C. and at a pressure within the range of 1 to 12 atmospheres.

10 Claims, No Drawings

PROCESS FOR SPLITTING ACETALS AND HEMIACETALS

This invention relates to an improved process for splitting acetals or hemi-acetals.

The process comprises use as a catalyst for the splitting reaction of a sulfonic ion exchange resin in its acid form such as having —$SO_3H$ groups, said resin being insoluble in the reaction medium or mixture. The splitting reactions involved are mainly acetal hydrolysis by water and acetal alcoholysis by means of an alcohol which differs from the acetalized alcohol, the alcoholysis liberating the last named alcohol for replacement by the first named alcohol in the acetal molecule. These reactions can be illustrated by the following equations in which R, R' and R" can be organic radicals which are the same or different hydrocarbon radicals which may be straight or branched-chain alkyl radicals having from 1 to 12 carbon atoms, such as methyl, ethyl, propyl, isopropyl, butyl, isobutyl, amyl, isoamyl, hexyl, 2-ethyl butyl, heptyl, octyl, isooctyl, 2-ethyl hexyl, nonyl, isononyl, decyl and dodecyl; alkenyl radicals having from 3 to 12 carbon atoms, such as propenyl, butenyl, hexenyl and allyl, the olefinic linkage of the alkenyl radicals being not in $\alpha,\beta$; alicyclic radicals, such as cyclohexyl and methyl cyclohexyl; and aralkyl radicals, such as benzyl. R can also be hydrogen or an aromatic radical, such as phenyl, tolyl and xylyl, the aromatic radical having only one nucleus, the nucleus bearing no more than two alkyl substituents, and the total amount of carbon atoms of the alkyl substituents, if any, being from 1 to 5.

Hydrolysis:
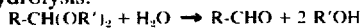

Alcoholysis:

Acetal hydrolysis by means of an aqueous solution of a strong inorganic acid, such as sulfuric acid, involves serious inconveniences in actual practice. On the one hand, the use of a strong inorganic acid in aqueous solution introduces problems of corrosion of the apparatus and requires the use of expensive materials that are capable of withstanding such acids. On the other hand, difficulties are encountered during the step of removal of the acid catalyst from the reaction products, especially where the acid is removed together with one of the reaction products. Such is the case, in particular, in the manufacture of aqueous formaldehyde by hydrolysis of methylal, i.e. formaldehyde dimethylacetal, or else in the recovery of a water soluble hydroxy compound which does not form an azeotrope with water, such as glycol, and produced through hydrolysis of one of its acetals.

These inconveniences of conventional processes are completely avoided if, in accordance with the invention, a sulfonic ion exchange resin in its acid form is used as the catalyst and it is an object of this invention to provide a method for the practice of same.

Among the possible industrial applications of the acetal hydrolysis process of this invention, there may be especially mentioned, without limitation, the hydrolysis of methylal into formaldehyde and methanol and the hydrolysis of butyrals and isobutyrals of the raw butyl alcohols from the oxo synthesis. In the case of methylal, the formaldehyde can be recovered directly by simple distillation of the reaction products. The formaldehyde is then obtained in the form of its solution in water or in water plus methanol, which solution constitutes the tail product of the distillation. In the case of the butyrals and isobutyrals, the butyraldehyde and isobutyraldehyde can be easily separated by distillation from the corresponding alcohols, in the form of their binary aldehyde-water azeotropes.

As aforesaid, the process of the invention can also be applied, with similar advantages, to alcoholysis of acetals or hemi-acetals by means of alcohols, with formation of acetals in which the alcohol radicals are different from those on the original material. An industrial application of such reaction is, inter alia, without limitation, the reaction of methanol with a solution of a higher molecular weight formaldehyde acetal, such as formaldehyde dibutylacetal dissolved in butanol or water saturated butanol.

In practicing the process of the invention, use is preferably made of an ion exchange resin of the polystyrene sulfonic type, such as represented by "Allassion CS," "Amberlite IR 120," "Amberlyst 15," "Dowex 50," "Duolite C 20," "Duolite C 25," "Lewatit S 100," "Lewatit S 115" and "Redex CF."

The process of the invention can be carried out batchwise but it lends itself well to continuous operation. Continuous operation may, for example, be performed by passing the liquid reactants heated to reaction temperature through a reaction zone containing the catalyst and maintained under the pressure required for maintaining the reaction medium or mixture in a liquid state at the operating temperature. One may advantageously employ, inter alia, an inverted cone-shaped reactor through which the reaction medium or mixture flows in an upward direction thereby to maintain the finely divided catalyst in a dispersed or suspended state or in a fluidized state through the liquid phase. A reactor of the type described is illustrated in U.S. Pat. No. 2,980,731.

The reactions with which this invention is concerned generally proceed rapidly with acetals of moderately high molecular weight. It is advantageous to carry out these reactions at relatively high temperature for a number of reasons, one of which is to take advantage of the increase in the rate of reaction resulting from increased reaction temperature, and because in certain hydrolysis operations the liberated aldehyde tends to form complex compounds of varying and not accurately defined polymerization degree at moderately high temperatures. Such is the case, for example, with formaldehyde. However, the temperature range suitable in actual practice has an upper limit calculated to avoid risks of formation of ethers from the alcohols present in the reaction mixture. For these reasons, it is preferred to operate at a temperature which is not less than 60° C. nor above 140° C.

The pressure maintained in the reactor depends somewhat upon the partial vapor pressures of the liquids present and can be calculated easily by the conventional methods. For guidance, it may be said that absolute pressures within the range of 1 to 12 atmospheres are usually employed.

In the above specified temperature range, the contact time between the reactants and the catalyst may vary from 15 minutes to 4 hours, depending somewhat upon the kind of acetal that is being treated.

For the hydrolysis reaction, it is recommended, if possible, to operate in a homogeneous liquid phase. Since acetals are insoluble or only sparingly soluble in water, it is advisable to operate in the presence of a solvent for the acetals, which solvent is also miscible with water under the operating conditions. In order that no substance foreign to the reaction be introduced, it is advantageous to make use as a solvent of an alcohol which is the same as that liberated by the hydrolysis reaction. The amount of water used in such instance, which will depend upon the solvent power of the alcohol or other solvent introduced into the reaction medium, may vary within a rather wide range, preferably from 5 to 30% by weight of the reaction medium or mixture, depending upon the operating conditions employed.

EXAMPLE 1

There is carried out batchwise, in the presence of a polystyrene sulfonic acid type exchange resin ("Allassion CS"), several operations of hydrolysis of butyl butyrals formed during the oxo synthesis of butyraldehydes (namely, n-butyraldehyde and isobutyraldehyde). It is known that this synthesis gives rise, as by-products, to condensed compounds and leads to the presence, inter alia, of a butanol (n-butanol and isobutanol) fraction containing important amounts of the various isomeric butyl and isobutyl butyrals and isobutyrals.

These butyrals and isobutyrals are treated in accordance with the above described hydrolysis process, under the specified operating conditions under which the butanols (n-butanol and isobutanol) are entirely miscible with water and play the role of solvents for the latter.

The following operations have been carried out with these butyral and isobutyral mixtures:

| Experiment No.: | | 1 | 2 | 3 | 4 | 5 |
|---|---|---|---|---|---|---|
| Absolute pressure | (bar) | 8 | 8 | 8 | 8 | 8 |
| Amount of acetals | (ml) | 2000 | 2000 | 2000 | 2000 | 2000 |
| Water added | (ml) | 200 | 200 | 200 | 200 | 200 |
| Catalyst | (ml) | 400 | 400 | 400 | 400 | 400 |
| Temperature | (°C) | 130 | 130 | 130 | 130 | 130 |
| Reaction time | (hours) | 3 | 3 | 3 | 2 | 1 |
| Starting butyraldehydes combined in the form of butyrals (moles per liter) | | 2.45 | 2.56 | 2.56 | 2.57 | 2.57 |
| Butyraldehyde liberated (moles per liter) | | 2.31 | 2.46 | 2.45 | 2.40 | 2.34 |
| i.e., % | | 94.25 | 96.1 | 95.6 | 93.3 | 91 |

EXAMPLE 2

Into an inverted cone-shaped reactor of the type previously described, having a capacity of 0.7 liters, there is placed 0.35 liter of polystyrene sulfonic acid exchange resin ("Dowex 50 W"). Continuous introduction is made at the base, at a rate of 0.35 liter per hour of a mixture containing, by weight, 85.54% methylal (11.25 moles per kg), 4.55% methanol (1.42 moles per kg) and 9.91% water (5.5 moles per kg). The reactor is maintained at a temperature of 96° C. and under an absolute pressure of 7 atmospheres.

When the apparatus achieves equilibrium, the formaldehyde content in the liquid issuing from the reactor is 1.6 moles per kg. This corresponds to a conversion rate of the methylal of 14.23%. The weight concentration of the formaldehyde with respect to the total, formaldehyde plus water in the reaction products is 40.5%.

EXAMPLE 3

In a reactor the same as that of Example 2 but of greater capacity, alcoholysis of formaldehyde di-n-butyl acetal is effected by methanol to produce methylal.

Into the reactor containing 6 liters of polystyrene sulfonic acid exchange resin ("Amberlite IR 120") the following mixture is introduced continuously, per hour, through the base of the reactor:

| | |
|---|---|
| Methanol | 6000 g |
| Formaldehyde dibutylacetal | 1280 g |
| n-Butanol | 2216 g |
| Water | 904 g |

The reactor is maintained at a temperature of 75° C. and under an absolute pressure of 5 bar. The liquid mixture issuing from the reactor has the following composition, per hour:

| | |
|---|---|
| Methylal | 380 g |
| Methanol | 5680 g |
| Formaldehyde dibutylacetal | 480 g |
| n-Butanol | 2956 g |
| Water | 904 g |

The molar conversion rate of the formaldehyde dibutylacetal is 62.5%.

In a continuous operation, after recovery of the reaction products, the unconverted starting acetal may be recycled to the reactor so as to obtain a total conversion rate of substantially 100%.

From the foregoing it will be evident that I have provided a new and improved process for splitting acetals. It will be understood that changes may be made in the details of formulation and operation without departing from the spirit of the invention, especially as defined in the following claims.

I claim:

1. A process for splitting acetals and hemiacetals which comprises passing a homogeneous liquid reaction mixture comprising a compound selected from the group consisting of an acetal having the formula:

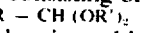
R — CH(OR')$_2$ and a hemiacetal having the formula:

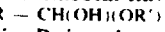
R — CH(OH)(OR')

wherein R is selected from the group consisting of hydrogen and a hydrocarbon group containing 1–12 carbon atoms and R' is a hydrocarbon group containing 1–12 carbon atoms and a material selected from the group consisting of water and a mixture of alkanol and water, wherein the water constitutes between 5–30% by weight of the reaction mixture, upwardly through a fluidized catalyst, said catalyst being a sulfonic ion exchange resin in acid form, at a temperature of 60° to 140°C. and a pressure sufficient to maintain the reaction mixture in the liquid phase.

2. The process as claimed in claim 1 in which said material is water.

3. The process as claimed in claim 1 in which the sulfonic ion exchange resin is a polystyrene resin having sulfonic acid groups.

4. The process as claimed in claim 1 in which the reaction is carried out under a pressure within the range of 1 to 12 atmospheres.

5. The process as claimed in claim 1 in which the reaction in the presence of the catalyst is for a time within the range of 15 minutes to 4 hours.

6. The process as claimed in claim 2 in which the reaction is carried out in a homogeneous liquid phase which includes introducing into the reaction medium a solvent for the acetal or hemi-acetal, which solvent is miscible with water under the reaction conditions.

7. The process as claimed in claim 6 in which the solvent is an alcohol which is the same as the alcohol produced by the hydrolysis reaction.

8. The process as claimed in claim 1 in which the reaction is carried out as a continuous operation.

9. The process as claimed in claim 8 in which the reactant medium is heated to reaction temperature, and passed through a reactor containing the catalyst while being maintained under the desired pressure.

10. The process as claimed in claim 9 in which the reactor is an inverted cone-shaped reactor.

* * * * *